United States Patent
Dutta et al.

(10) Patent No.: US 7,225,442 B2
(45) Date of Patent: May 29, 2007

(54) METHOD AND SYSTEM FOR DYNAMIC UTILIZATION MECHANISMS FOR FACILITIES WHOSE RESERVATION STATUS CAN CHANGE DYNAMICALLY

(75) Inventors: Rabindranath Dutta, Austin, TX (US); Dwip N. Banerjee, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 859 days.

(21) Appl. No.: 09/895,118

(22) Filed: Jun. 29, 2001

(65) Prior Publication Data
US 2003/0004772 A1 Jan. 2, 2003

(51) Int. Cl.
G06F 9/46 (2006.01)
G06F 13/00 (2006.01)

(52) U.S. Cl. .............. 718/100; 718/102; 718/104; 718/105; 705/5; 705/6; 705/7; 705/8; 705/26

(58) Field of Classification Search ........ 718/100–108; 705/5–8, 26
See application file for complete search history.

(56) References Cited

U.S. PATENT DOCUMENTS

| | | | | |
|---|---|---|---|---|
| 4,554,418 A | * | 11/1985 | Toy | 379/88.01 |
| 4,931,932 A | * | 6/1990 | Dalnekoff et al. | 705/5 |
| 5,832,454 A | * | 11/1998 | Jafri et al. | 705/6 |
| 5,881,216 A | * | 3/1999 | Johnson | 714/15 |
| 5,978,463 A | * | 11/1999 | Jurkevics et al. | 379/202.01 |
| 5,987,420 A | * | 11/1999 | Maeda et al. | 705/5 |
| 6,014,760 A | * | 1/2000 | Silva et al. | 714/46 |
| 6,016,478 A | * | 1/2000 | Zhang et al. | 705/9 |
| 6,978,253 B2 | * | 12/2005 | Lin | 705/26 |
| 2002/0138325 A1 | * | 9/2002 | Mashimo et al. | 705/8 |
| 2004/0064347 A1 | * | 4/2004 | VanOrman | 705/5 |
| 2006/0129444 A1 | * | 6/2006 | Baeza et al. | 705/8 |

FOREIGN PATENT DOCUMENTS

| | | | | |
|---|---|---|---|---|
| JP | 63234356 A | * | 9/1988 |
| JP | 2000040112 A | * | 2/2000 |
| JP | 2002-279113 | * | 3/2001 |

* cited by examiner

Primary Examiner—Meng-Al T. An
Assistant Examiner—Jennifer N. To
(74) Attorney, Agent, or Firm—Jeffrey S. LaBaw; Darcell Walker

(57) ABSTRACT

This invention is a method and system for reserving a facility or service after the cancellation of an initial reservation for the facility of service. The system for this invention comprises a reservation center that contains reservation information about multiple facilities and services that available for use. This information includes times, quantity and quality of the facilities and services that are available. Also included in this reservation center is information about the users that are interested in reserving and using the currently reserved facility or service. The system of the present invention also includes remote devices that the potential users possess. The reservation center will use a particular remote device for a corresponding use to alert the user there has been a cancellation and that the facility or services is available for use by the alerted user. The primary user and all backup users can use the Internet capabilities to communicate with the reservation center.

32 Claims, 5 Drawing Sheets

| User Identification | Notification Time | Quality | Quantity | Activity Date | Activity Time |
|---|---|---|---|---|---|
| User 1 | 5:00pm | Reserve seats | 4 seats | dd/mm/yr | 7:00pm |
| User 2 | 5:30pm | Box seats | 5 seats | dd/mm/yr | 7:00pm |
| User 3 | 6:00pm | Reserve seats | 3 seats | dd/mm/yr | 7:00pm |
| 46 | 47 | 48 | 49 | 50 | 51 |

FIG. 5

METHOD AND SYSTEM FOR DYNAMIC UTILIZATION MECHANISMS FOR FACILITIES WHOSE RESERVATION STATUS CAN CHANGE DYNAMICALLY

FIELD OF THE INVENTION

This invention relates to reserving facilities and services, and in particular to a method and system for re-booking previously booked facilities and services when there is a cancellation of the initial booking.

BACKGROUND OF THE INVENTION

Many activities in which people participate require the person to reserve the facility or equipment prior to the time for use by the person. The reason it is necessary to reserve the resource is because often more persons desire the resource than is available. Therefore, the manager of a resource establishes a schedule of use in which participants have slotted times or spaces for use the resource. Some activities that require reservations are travel, car rentals and hotel lodging and recreational activities such as playing golf. Reservations help resource owners manage the use of the resource in order to achieve maximum and efficient use of the resource and maximum profit for the owner.

When the owner has fully booked or reserved the resource, the owner has to then turn away persons desiring to use the resource. However, if one of the reservations gets cancelled, or the reserver fails to show up the resource would go unused at that time. In this particular situation, this non-use would cost the owner money. To address this possibility, some owners require the reserving parties to put down a deposit to insure that the reservation slot will generate revenue. This solution still does not promote maximum and efficient use of the resource.

One approach to employ in an attempt to achieve maximum and efficient use is to overbook the resource. In this method, the owner would make the resource available to more users than could actually use the resource at the particular time. This practice of overbooking is particularly common in the travel industry in general and the airline industry in particular. In travel, passengers typically purchase tickets in advance of travel, and are included in a database of a reservation system as having a reservation. On the date of travel, they must check in, or their seat will be given up to other passengers. Because statistics show that there will always be a number of passengers who will not show up on the designated date of travel, carriers typically "overbook" by selling a number of seats over the number of seats that are actually available, based on mathematical calculations. If the passenger does not check in, their seat may be used to accommodate overbooking, or may be given to standby passengers. Overbooking is done because, often, some of the passengers with reservations do not actually take the flight. Thus, without overbooking, the flight would depart at less than capacity.

By overbooking the flight, the carrier seeks to maximize its profits by using the total capacity of the vehicle. However, if the overbooking level is set too high, some of the passengers booked on the flight will be "bumped" from the flight, i.e. will not be seated because there are fewer "no shows" than passengers booked. This inconveniences passengers who may become dissatisfied with the carrier. Thus, while trying to maximize profits, most carriers try to minimize the number of "bumped" passengers. In addition, this practice of bumping passengers requires that the carrier compensate the passengers that do not have seats as a result of overselling the flight.

There have been other attempts to address the problem of maximizing resource usage through a reservation system. U.S. Pat. No. 5,978,463, to Jurkevics, et al. describes an automated reservation scheduling system for audio conferencing resources. The reservation scheduling system schedules conference calls in real-time in a way that optimally makes use of audio conferencing resources. As a result, a party scheduling an audio conference may receive a confirmation and a conferencing phone number on the same call that the parties use to initiate the scheduling of a conference. The automated reservation scheduling system reserves audio conferencing resources to ensure that a sufficient amount of resources are available for the scheduled time slot in which the audio conference is to take place. The resources are reserved based upon a determination of the resources that will be required to realize the audio conference requested by the requesting party.

In another approach, a method of reserving resources is practiced in a computer system. In accordance with this method, an automated scheduler is provided for scheduling reservations of for the resource. A request is received from a caller to schedule a resource, which could be a conference room. The automated scheduler is then used to identify selected resources that are available to the requester. The selected resources are then reserved for use for the user.

Another reservation method is practiced in a computer system such that a request to schedule a facility at a given date and time is received by the scheduler. The resources within the facility are examined to determine the availability of resources at the specified date and time. The available facility resources that fulfill the needs of the requester are identified as qualified facility resources. Some of the qualified facility resources are selected as the ones to be reserved for the requester.

In another example of the reservation of an audio conference facility, a request to schedule a first audio conference is received on a computer system. A phone number that participants in the first audio conference may call to participate is determined and reserved. Audio conferencing resources to be used for the first audio conference are determined and reserved independently of the determining of the phone number for the first audio conference. A second request to schedule a second audio conference is received. A phone number and audio conferencing resources to be used for the second audio conference are determined and reserved interdependently. The determining of the phone number determines the audio conferencing resources to be used for the second audio conference.

Although these reservation methods do address some of the concerns related to achieving maximum usage of a resource, there has not been any focus on achieving maximum usage through rescheduling resources after the initial party has cancelled the initial reservation. There is a need for a system that can increase resource usage through the re-reserving the cancelled slot to a second entity interested in the slot.

SUMMARY OF THE INVENTION

It is an objective of this invention to provide a method and system that will re-book a facility or service that has a cancelled booking.

It is another objective of this invention to provide a method and system that alert a potential user of an available facility or service.

It is a third objective of the present invention to provide a method and system that can dynamically change the reservation status of a facility or service.

It is a fourth objective of the present invention to provide a queue of backup users interested in a reserved service or facility.

It is a fifth objective of the present invention a reservation system that can automatically rebook a facility or service when there has been a canceled reservation.

This invention is a method and system for reserving a facility or service after the cancellation of an initial reservation for the facility of service. The system for this invention comprises a reservation center that contains reservation information about multiple facilities and services that available for use. This information includes times, quantity and quality of the facilities and services that are available. Also included in this reservation center is information about the users that are interested in reserving and using the currently reserved facility or service. The system of the present invention also includes remote devices that the potential users possess. The reservation center will use a particular remote device for a corresponding use to alert the user there has been a cancellation and that the facility or services is available for use by the alerted user. The primary user and all backup users can use the Internet capabilities to communicate with the reservation center.

In the method of this invention, a queue created that contains a list of potential users that are interested in using the currently reserved facilities or services. This list will have contact information on each user. This information will enable the user to be selected and alert the user of an available resource and information concerning the requirements under which a user would consider the newly available facility or service. When a reservation cancellation occurs, the method would evaluate the users in the queue based on the requirements of each user in the queue. When the method has identified a suitable user, that user is contacted and offered the reservation for that facility of service. Depending on the circumstances at the time of the notification to the user that facility or service is available, the identified user can have the option to reject the facility or service reservation notification. If the identified user accepts the reservation offer, the reservation is updated to the new reservation. The backup queue is also updated to show that the new user is no longer in the queue. This invention provides a more efficient method for re-booking previously reserved facilities and services.

DESCRIPTION OF THE DRAWINGS

FIG. 5 is a diagram of the list of records of the users in a backup queue of the present invention.

DETAILED DESCRIPTION OF THE INVENTION

Figure 1:
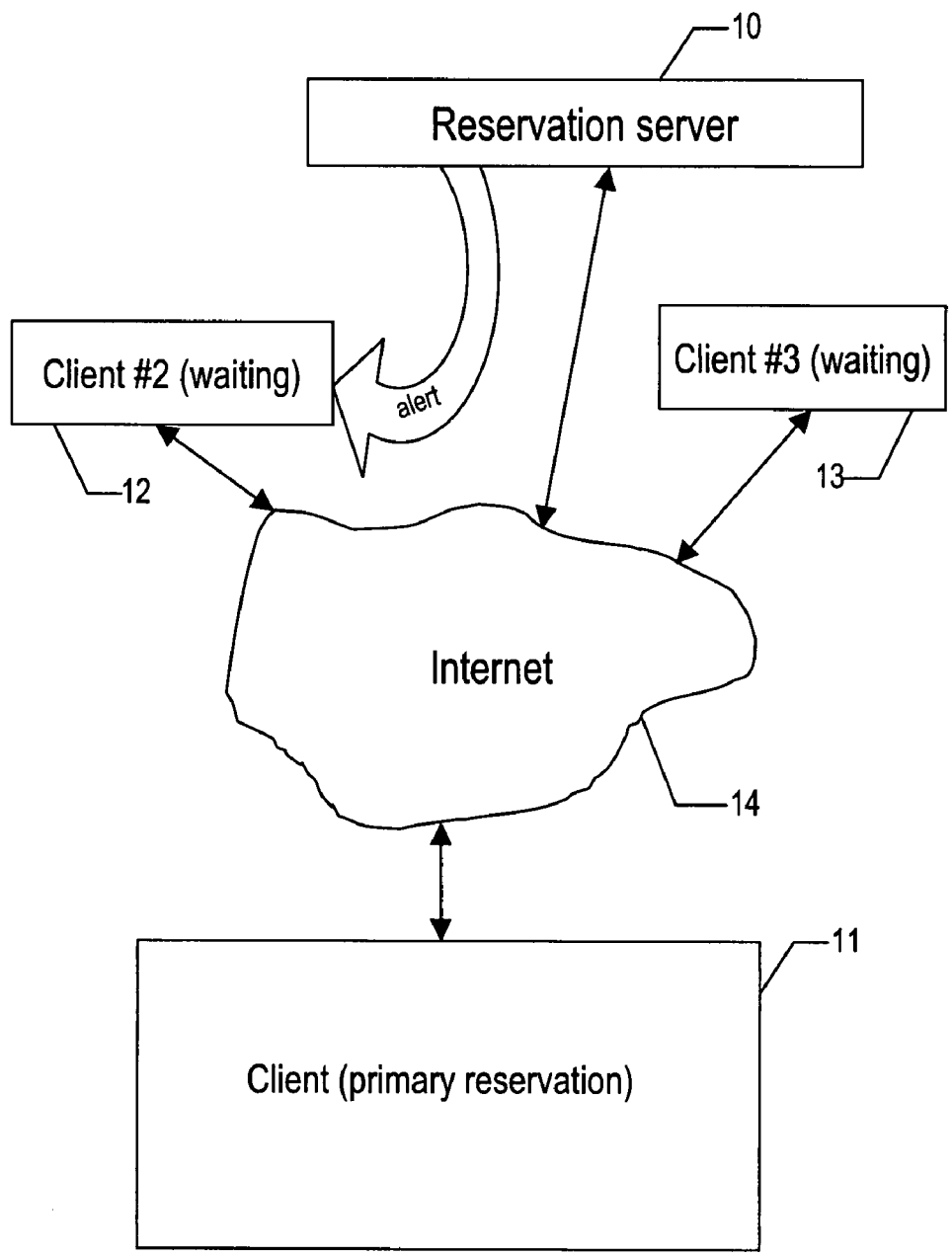
FIG. 1 is a structural diagram of the reservation system of the present invention.

Referring to FIG. 1, shown is a structural configuration of the present invention. In this configuration is a reservation center 10. This center contains the information about the facility or service (herein after referred to as resources). This information can include the date and time of the service, and the location of the resource. Depending on the resource, the quantity or size of the resource is also information that a potential user may want to know about the resource. In an example, if a person wanted to reserve a golf course to play a round of golf, there would be information such as: 1) the available times to play, which includes the date and hour and 2) the identity of the particular course (the user may want to play 9-hole course instead of an 18-hole course. The identity of the course could relate to the quality of the course. Some courses may have a designed more suited for beginners and other courses may be more difficult to play. Another example of information in the reservation center could be information about tickets for an event. This information could again contain date and time of the event, location of the tickets and the number of available tickets at the location in the facility. A user could desire a specific number of tickets, in a specific section of the facility and for a particular event. The user may want all three requirements met for them to be interest in a cancelled reservation. Other users may be willing to settle for meeting two of the three requirements. This illustration shows time, quantity and quality considerations that could be involved in matching a potential user with a currently available resource. The reservation center could be a server with communication, computation, data processing and storage capability. The reservation center would contain a reservation queue for each reservation slot for all resources that a user can reserve.

FIG. 1 shows a primary client reservation 11. This reservation is by the user that has reserved the resource for the designated time. As shown, this user could be at any location remote to the reservation center. If the user desired to communicate with the reservation center, the user could contact the center though a wireless device such as personal digital assistant or a cellular telephone. The user could also use a computer to connect and communicate with the reservation center. The primary user could access their reservation and check for time, location or other information contained about the reservation. The users 12 and 13 can communicate with the reservation center using the above-mentioned wireless devices or computer. The reservation center may use the communication means preferred by the waiting users to communicate with these users.

The medium through which the users and the reservation center communicate with each other can be the Internet 14 as shown in FIG. 1. With the Internet as the communication medium, the users would have an electronic address stored in the reservation center database record for that user. Any information to be sent from the communication center to the user would be sent to the electronic address of the user. The user would communicate with the reservation center in the same manner that others communicate on the Internet. The user would access the reservation center web site or electronic address and send the information to the reservation center. The other medium for communication between the users and the reservation center could be point-to-point communication via a telephone connection. In this situation, the user's telephone number would be in the database record for the user. The reservation center would contact users in the queue when a reserved resource becomes available.

The ability to communicate via electronic or point-to-point means enables communication without the need to know the physical location of the user. This communication capability enables a primary user that has the reservation for a resource to change or cancel the reservation by contacting the reservation center, accessing the particular reservation for the resource and canceling the reservation. The reservation change can occur through Internet or point-to-point mediums.

Figure 2A:
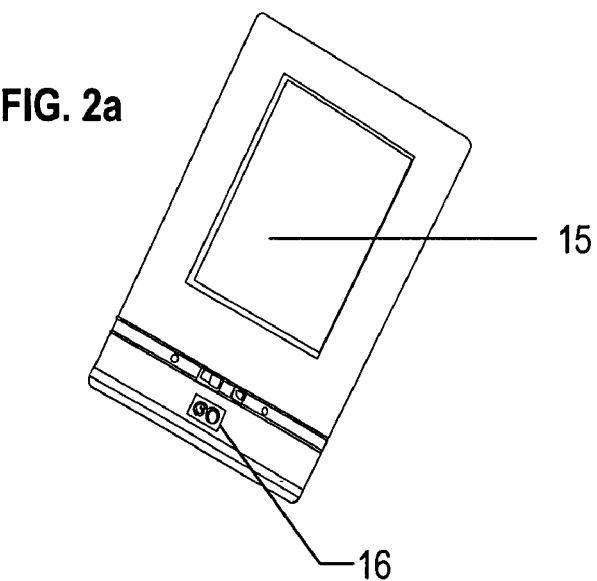
FIGS. 2a and 2b are devices used for communication between a user and the reservation center via a computer network.
Figure 2B:
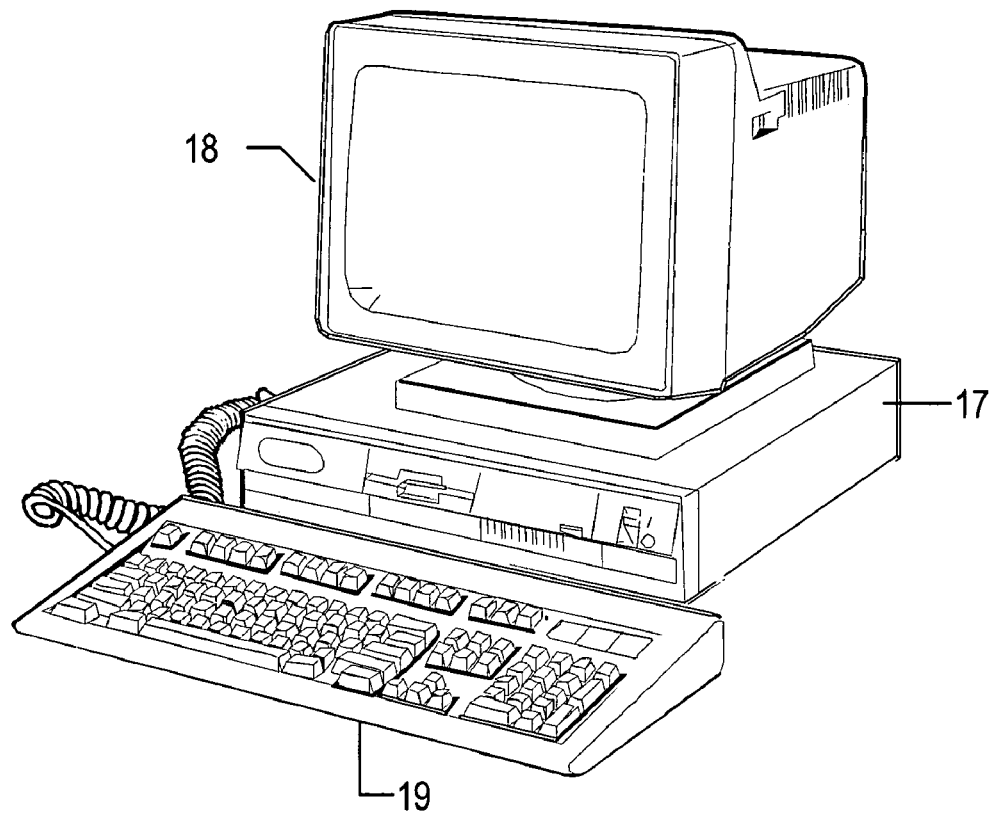

As mentioned, the communication in the present invention can be via a computer network or point-to-point. FIG. 2a hows a personal digital assistant (PDA) interface which a can enable communication between a user and the reservation center via a computer network. This PDA has internal processing and store capabilities. As shown, it also has a screen 15 and input controls 16. FIG. 2b is depicted a pictorial representation of data processing system 10 which can also be used in implementation of the present invention via a computer network. As may be seen, data processing system includes processor 17 that preferably includes a graphics processor, memory device and central processor (not shown). Coupled to processor 17 is video display 18 which may be implemented utilizing either a color or monochromatic monitor, in a manner well known in the art. Also coupled to processor 17 is keyboard 19 to enable input capabilities.

Figure 3:
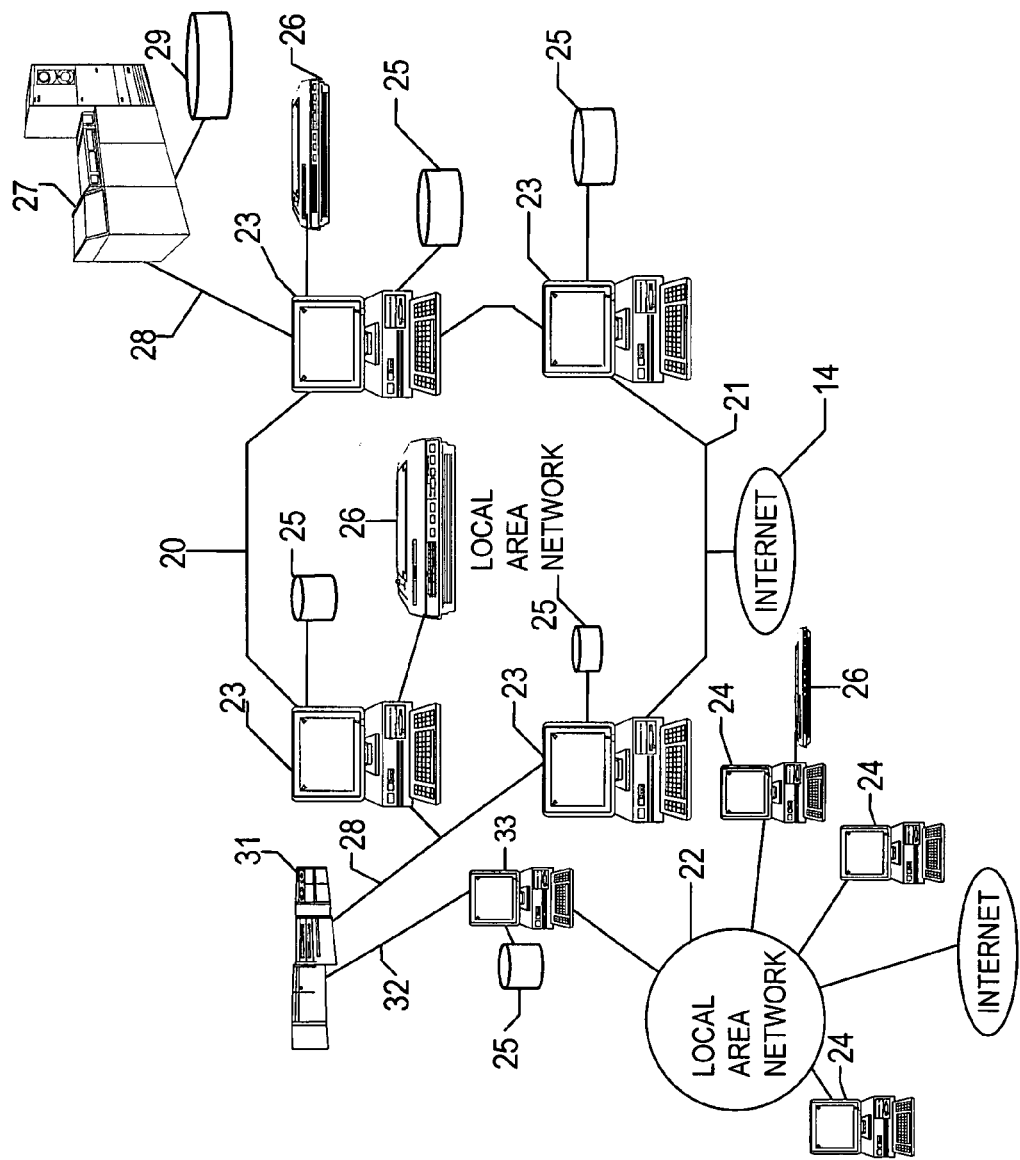
FIG. 3 is a diagram of a computer network over which messages may be transmitted between a user and the reservation center of the present invention.

FIG. 3 is depicted a pictorial representation of a distributed computer network environment 20 in which one may implement the method and system of the present invention. As may be seen, distributed data processing system 20 may include a plurality of networks, such as Local Area Networks (LAN) 21 and 22, each of which preferably includes a plurality of individual computers 23 and 24, respectively. Of course, those skilled in the art will appreciate that a plurality of Intelligent Work Stations (IWS) coupled to a host processor may be utilized for each such network. Any of the processing systems may also be connected to the Internet as shown. As is common in such data processing systems, each individual computer may be coupled to a storage device 25 and/or a printer/output device 26. One or more such storage devices 25 may be utilized, in accordance with the method of the present invention, to store the various data objects or documents which may be periodically accessed and processed by a user within distributed data processing system 20, in accordance with the method and system of the present invention. In a manner well known in the prior art, each such data processing procedure or document may be stored within a storage device 25 which is associated with a Resource Manager or Library Service, which is responsible for maintaining and updating all resource objects associated therewith.

Still referring to FIG. 3, it may be seen that distributed data processing system 20 may also include multiple mainframe computers, such as mainframe computer 27, which may be preferably coupled to Local Area Network (LAN) 21 by means of communications link 28. Mainframe computer 27 may also be coupled to a storage device 29 which may serve as remote storage for Local Area Network (LAN) 21. A second Local Area Network (LAN) 22 may be coupled to Local Area Network (LAN) 21 via communications controller 31 and communications link 32 to a gateway server 33. Gateway server 33 is preferably an individual computer or Intelligent Work Station (IWS), which serves to link Local Area Network (LAN) 22 to Local Area Network (LAN) 21. As discussed above with respect to Local Area Network (LAN) 22 and Local Area Network (LAN) 21, a plurality of data processing procedures or documents may be stored within storage device 29 and controlled by mainframe computer 27, as Resource Manager or Library Service for the data processing procedures and documents thus stored. Of course, those skilled in the art will appreciate that mainframe computer 27 may be located a great geographical distance from Local Area Network (LAN) 21 and similarly Local Area Network (LAN) 21 may be located a substantial distance from Local Area Network (LAN) 24. That is, Local Area Network (LAN) 24 may be located in California while Local Area Network (LAN) 21 may be located within Texas and mainframe computer 27 may be located in New York.

Figure 4:
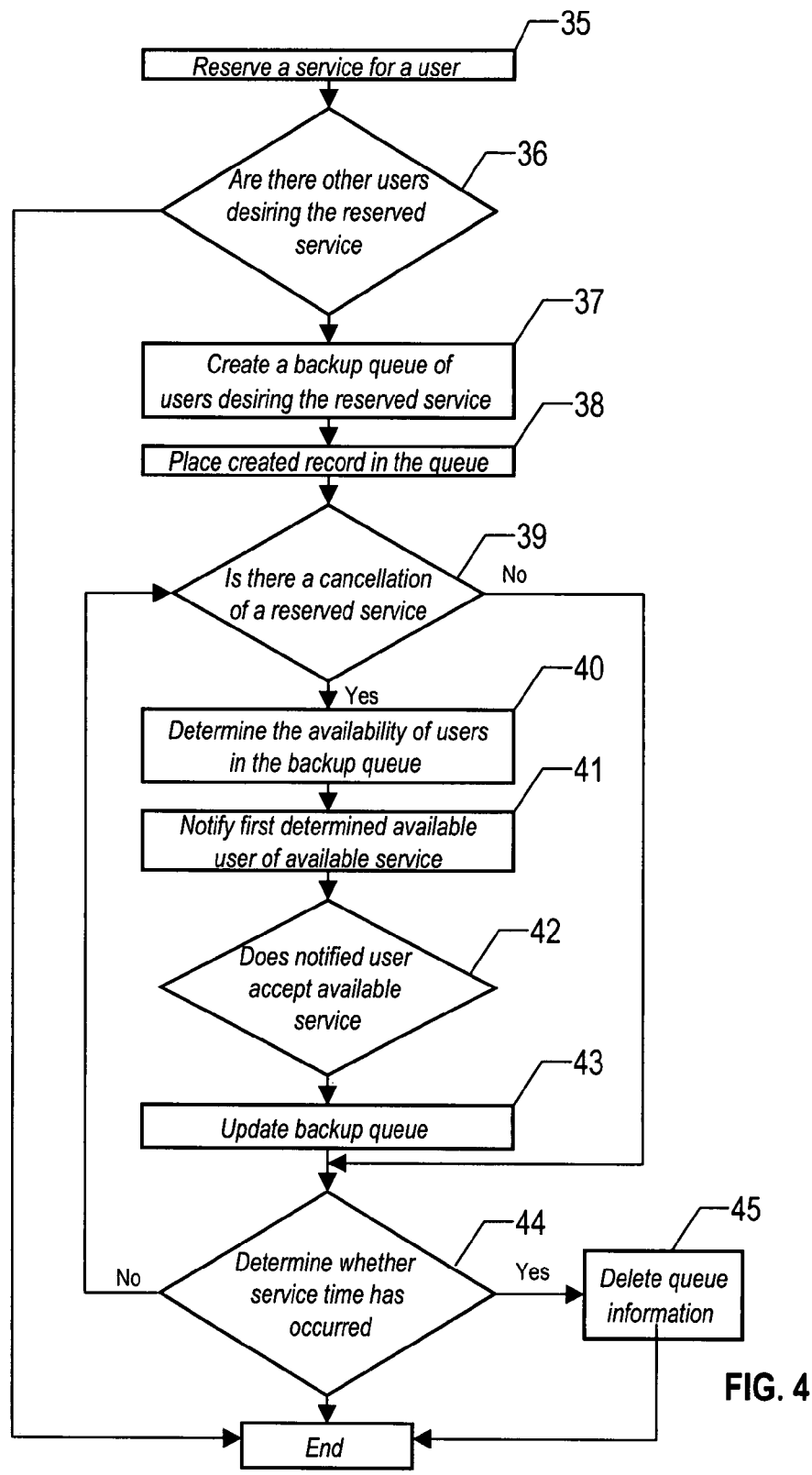
FIG. 4 is a detailed flow diagram of the steps in the method of the present invention.

FIG. 4 shows the basic steps involved in implementing the techniques of the present invention in a resource reservation system. In this process, a customer/user contacts a reservation system to reserve a resource in any conventional manner. If that resource is available, the customer receives the reservation for the specific date, time and location 35. The reservation is entered into the reservation database. In a conventional reservation system, if another user inquires about the particular resource that has been reserved, the interested user would be told that the resource is not available. However, in the present invention, an interested user could have the option to reserve the reserved resource, if the user cancels the present reservation. Step 36 receives a prompt when a second user is interested in reserving the resource. Step 37 creates a backup queue for subsequent users interested in the reserved resource. The second and subsequent inquiries would have the option to be included in this backup queue. This queue is conceptually similar to a waiting list used by many organizations when there are more persons desiring a resource than there is space available in the resource.

In the present invention, as part of the creation of the backup queue a potential user submits requirements under which the user would be interested in the reserved resource. These requirements are the conditions under which the potential user wants to be notified in the event the present is canceled. One of these requirements could be notification time, in which the user is not interested in the reservation, if the notification occurred within a certain time of the reservation. For example, the potential user may have a time notification requirement for playing a particular golf course. If the user is in a backup queue for a golf course reservation, this user may require an hour notice in order to make a tee time if there is a cancellation. If the golf reservation is for 10:00 a.m., and it takes the user an hour to arrive at the golf course, this potential user will not receive consideration for reservation if a cancellation occurs at 9:15 a.m. that morning. However, if the user only had a 30-minute time notification requirement, this potential user would receive consideration for the reservation. Other potential user requirements could be quality of the reservation. An example of this requirement could be seat locations in a facility for an event. The user may only be interested in reserve seating or box seating. The system of the present invention would not notify a potential user with this requirement for available seats in other locations. A third user requirement could be quantity. In the previous example, the user may require a minimum of five seats in the same location. With this requirement, this potential user will be notified if this number of seats became available. When creating the backup queue, the present invention creates a record for each potential user and places this record in the backup queue 38. This record contains the specific requirements for that potential user.

At this point, the reservation system is in a monitor state. If the primary user cancels the reservation, the reservation system of the present invention detects the cancellation 39. The next step 40 is to check the requirements of the potential users in the particular backup queue in order to determine the availability of potential users in the queue. This check can be performed in order in which the users made the reservation. This check of the user requirements involves the comparison of the potential user requirements with the current conditions of the cancellation. Depending on the type of reservation, the current conditions could include time of the cancellation, quantity of seats cancelled, and location of seats cancelled. The reservation system of the present invention could simply select the first user in the queue that could be accommodated or the selection could be for the user that has the closest match to the cancelled reservation. This latter approach would possibly provide for a more efficient use of the resource. Examining the seating example, if the requirements of the first user were for 2 seats in the location of the cancelled seats, this requirement could be met because the cancellation was for five seats. This match would still leave three available seats. The system of the present invention would then examine the backup queue for a potential user that required three or less seats at that seat location. The process would then repeat to identify a potential user having those quantity requirements. However, if the reservation system initially sought to identity the user with requirements that closely matched the canceled reservation, a potential user requiring four seats would receive the first option before the user requiring two seats, even if the latter user was in the queue prior to the former user.

Step 41 notifies the selected user from the queue using the electronic address or telephone number in the database record. This notification informs the potential user of the available reservation and gives the potential user a time frame in which to accept the reservation. The notified user can accept the reservation by confirming his/her interest in step 42. The notified user can decline the reservation by sending a decline message or by not responding with the time frame specified in the notification. When the user declines the reservation, the process returns to step 40 and notifies the next available user in the queue. Upon the acceptance of the reservation by a user in the queue, the queue and reservation information are updated 43 to reflect the new reservation of the resource. During this reservation cancellation and re-booking process, the reservation time is monitored to determine if the actual reservation time has occurred 44. If there has been no cancellation to this point, it is no longer necessary to maintain a backup queue for this reserved resource. Step 45 would delete the information in this queue.

FIG. 5 shows a list of records of the users in a backup queue of the present invention. As shown, each record has an identified user 46, and fields for time notification requirements 47, quality 48, quantity 49, date of activity 50 and time of activity 51. Each record is a profile of that user. The method of this invention uses this record and in particular the user requirement information to determine user availability when there is a reservation cancellation of the reserved resource. This record could also contain a field for communication means with the user. This field would indicate the preferred mechanism to communicate with the user. For example, the field could contain a telephone number xxx-yyyy or an e-mail address x@abc.com. FIG. 5 shows records for 3 potential users. An event is scheduled for 7:00 pm. As shown, each user has a different time notification requirement 47 and a different quantity requirement 49. Users one and three have the same quality requirement 48. Depending on the circumstance of a cancellation, the user that best matches the cancelled reservation would receive the first notification. If the cancellation occurred after 5:30 pm, only user three would be available. If the cancellation at noon, but the reservation was for box seats, only user two would receive consideration.

It is important to note that while the present invention has been described in the context of a fully functioning data processing system, those skilled in the art will appreciate that the processes of the present invention are capable of being distributed in the form of instructions in a computer readable medium and a variety of other forms, regardless of the particular type of medium used to carry out the distribution. Examples of computer readable media include media such as EPROM, ROM, tape, floppy disc, hard disk drive, RAM, and CD-ROMs.

We claim:

1. A computerized method for reserving a service initially reserved to another user comprising the steps of:
   creating a backup queue containing users interested in the initially reserved service by collecting and storing contact information for each user in the backup queue and by creating a notification profile for each user in the queue wherein each user specifies conditions under which the user should be notified of a reservation cancellation;
   detecting a cancellation of the reserved service;
   determining the availability of users in the backup queue for the cancelled service by creating a reservation status profile; comparing the reservation status profile with the notification profile for each user in the queue, determining whether there is match between the reservation status profile and the user notification profiles in the queue and selecting the user with the profile that is the closest match to the reservation status profile;
   notifying an available user from the backup queue that the service is available for use; and
   reserving the cancelled service for the notified available user from the backup queue upon consent from the notified available user.

2. The method as described in claim 1 wherein said contact information is an electronic address for each user.

3. The method as described in claim 1 wherein said contact information is a telephone number for each user.

4. The method as described in claim 1 wherein the specified user conditions comprise time based requirements.

5. The method as described in claim 1 wherein the specified user conditions comprise quantity based requirements.

6. The method as described in claim 1 wherein the specified user conditions comprise quality based requirements.

7. The method as described in claim 1 wherein said user notification profile further comprises:
   assembling a record of each user, the record containing user contact information and user specified conditions; and
   storing each assembled record in a database location.

8. The method as described in claim 1 further comprising after said reserving step the step of updating the backup queue to reflect the new reservation.

9. The method as described in claim 1 further comprising after said notifying step, the step of determining whether notified user has accepted the reservation.

10. The method as described in claim 9 wherein the user does not accept the reservation and further comprising:
   determining the next available user in the queue; notifying the available user of the available reservation;

determining whether notified user has accepted the reservation; and repeating said steps herein until a notified user accepts the reservation.

11. The method as described in claim 10 further comprising the step of updating the backup queue when the notified user accepts the reservation.

12. The method as described in claim 1 further comprising after said reserving step, the step of determining whether the time for the reserved service has occurred and terminating reserving method when the time for the reserved service has occurred.

13. The method of as described in claim 12 further comprising in said terminating step, the step of deleting all user records stored in the queue for that reserved service.

14. The method as described in claim 1 wherein the closest match is the first available user in the queue.

15. A computerized method for reserving a resource, which re-books the resource in the event of the cancellation of the existing reservation of the resource comprising the steps of:

reserving a resource for a user;

receiving reservations for the previously reserved resource when a reservation is received for the previously reserved resource;

creating a backup queue containing users interested in reserving the previously reserved resource, by collecting and storing contact information for each user in the backup queue and by creating a notification profile for each user in the queue wherein each user specifies conditions under which the user should be notified of a reservation cancellation;

detecting a cancellation of the reserved resource;

determining the availability of users in the backup queue for the cancelled resource, by creating a reservation status profile; comparing the reservation status profile with the notification profile for each user in the queue, determining whether there is match between the reservation status profile and the user notification profiles in the queue and selecting the user with the profile that is the closest match to the reservation status profile;

notifying an available user from the backup queue that the resource is available for use; and reserving the cancelled service for the notified available user from the backup queue upon consent from the notified available user.

16. The method as described in claim 15 wherein said user notification profile further comprises:

assembling a record of each user, the record containing user contact information and user specified conditions; and storing each assembled record in a database location.

17. The method as described in claim 15 further comprising after said reserving step the step of updating the backup queue to reflect the new reservation.

18. The method as described in claim 15 further comprising after said notifying step, the step of determining whether notified user has accepted the reservation.

19. The method as described in claim 18 wherein the user does not accept the reservation and further comprising:

determining the next available user in the queue;

notifying the available user of the available reservation;

determining whether notified user has accepted the reservation; and repeating said steps herein until a notified user accepts the reservation.

20. A computer program product stored in a computer readable medium for reserving a resource, which re-books the resource in the event of the cancellation of the existing reservation of the resource comprising:

instructions for reserving a resource for a user;

instructions for receiving reservations for the previously reserved resource when a reservation is received for the previously reserved resource, instructions for creating a backup queue containing users interested in reserving the previously reserved resource, by collecting and storing contact information for each user in the backup queue and by creating a notification profile for each user in the queue wherein each user specifies conditions under which the user should be notified of a reservation cancellation;

instructions for detecting a cancellation of the reserved resource;

instructions for determining the availability of users in the backup queue for the cancelled resource, by creating a reservation status profile; comparing the reservation status profile with the notification profile for each user in the queue, determining whether there is match between the reservation status profile and the user notification profiles in the queue and selecting the user with the profile that is the closest match to the reservation status profile;

instructions for notifying an available user from the backup queue that the resource is available for use; and instructions for reserving the cancelled service for the notified available user from the backup queue upon consent from the notified available user.

21. The computer program product as described in claim 20 wherein said user notification profile further comprises:

instructions for assembling a record of each user, the record containing user contact information and user specified conditions; and instructions for storing each assembled record in a database location.

22. The computer program product as described in claim 20 further comprising after said reserving instruction, instructions for updating the backup queue to reflect the new reservation.

23. The computer program product as described in claim 20 further comprising after said notifying instruction, an instruction for determining whether notified user has accepted the reservation.

24. The computer program product as described in claim 23 wherein the user does not accept the reservation and further comprising:

instructions for determining the next available user in the queue;

instructions for notifying the available user of the available reservation;

instructions for determining whether notified user has accepted the reservation; and instructions for repeating said steps herein until a notified user accepts the reservation.

25. A system for reserving a resource, which re-books the resource in the event of the cancellation of the existing reservation for the resource, said system comprising:

a backup queue containing collected and stored contact information of users interested in reserving a previously reserved resource and also containing a notification profile for each user in the queue wherein each user specifies conditions under which the user should be notified of a reservation cancellation;

a device for detecting the cancellation of a reservation for a resource;

a decision-making element that determines the availability of users in said backup queue for the now available resource, said decision making element containing a reservation status profile that is compared with the notification profile for each user in the queue, said decision making element also having the capability to select the user with the profile that is the closest match to the reservation status profile;

a notification element that notifies an interested user, determined from said backup queue, that the resource is available and determines whether the notified interested user accepts the reservation; and a reservation center, where the rebooking of the available resource to a notified user from the backup queue occurs.

26. The system as described in claim 25 wherein said reservation center contains information about the resource.

27. The system as described in claim 25 further comprising; a device for remote use by a user interested in reserving the available resource, said device enabling communication between the user and the reservation center; and a communication medium through which said reservation center and said device communicate with each other.

28. The system as described in claim 25 wherein said device for remote use further comprises a plurality of devices for remote use by users interested in reserving a resource.

29. The system as described in claim 25 wherein said backup queue comprises at least one record, said record containing user profile notification information.

30. The system as described in claim 29 wherein said profile information contains requirements under which a user in said backup queue desires notification of the availability of a previously reserved resource, said requirements comprising notification time, quality of resources available and quantity of available resources.

31. The system as described in claim 25 wherein said reservation center is a server located on a computing network.

32. The system as described in claim 31 wherein said reservation center server contains said backup queue, cancellation detection device, decision-making element and said notification element.

* * * * *